United States Patent Office 3,513,517
Patented May 26, 1970

3,513,517
MACHINING OF LARGE HOLLOW CYLINDRICAL WORKPIECES
Maso Galbarini and Francesco Cotta Ramusino, Milan, Italy, assignors to Societa Generale per l'Industria Metallurgica e Meccanica, Milan, Italy
Filed Oct. 23, 1967, Ser. No. 677,220
Claims priority, application Italy, Aug. 3, 1967, 52,666-A/67
Int. Cl. B23p 23/00
U.S. Cl. 29—26
7 Claims

ABSTRACT OF THE DISCLOSURE

In the maching of a large-diameter hollow cylindrical workpiece the latter is rotatably supported with its axis vertical and a machining head is supported within the workpiece on a vertical column fixed at its lower end, preferably in a pit, and clamped at its upper end to fixed structure to hold the column rigidly. An external machining head may be similarly supported.

---

The invention relates to the machining of large hollow cylindrical workpieces.

Large hollow cylindrical workpieces, such, for example, as paper-machine rolls and pressure-vessels for nuclear reactors and the like are notoriously difficult to machine.

Such workpieces are generally in the form of large steel castings having a cylindrical skirt provided with end flanges and possibly, internal or external projecting flanges. The machining of such workpieces usually entails turning of both the internal and external cylindrical surfaces as well as various other machining operations such as the drilling and tapping of holes, spot-facing, milling and reaming on flanges or other projections on the workpiece.

These various operations are normally performed on different machines, such as horizontal lathes, boring machines, milling machines, reaming machines, radial drilling machines, and the like. The use of several machines necessitates separate workpiece positioning and aligning operations, and this is time consuming. Moreover, positioning a large workpiece accurately for each successive machining operation is always difficult on account of the elastic deformation of large workpieces.

More particularly, internal machining of a large hollow cylindrical workpiece meets with difficulty on account of the considerable unsupported length of the machining tools or their supports which are usually employed for internal machining.

An object of this invention is to obviate the abovementioned difficulties by providing a method of and apparatus for machining large hollow cylindrical workpieces with improved support for the machining tool or tools.

In the method of machining a hollow cylindrical workpiece of large diameter according to the invention the workpiece is supported with its axis vertical for rotation about its axis and a machining head is supported within the workpiece on a vertical column which is fixed in a base at its lower end and clamped to fixed structure at its upper end to hold the column rigidly during internal machining of the workpiece by the machining head. Preferably a further machining head is supported externally of the workpiece on a further vertical column which is also fixed at its lower end and clamped to fixed structure at its upper end, said further head effecting external machining of the workpiece.

Both internal an dexternal machining of any kind can be carried out on large size hollow cylindrical workpieces by such an arrangement without re-positioning of the workpiece being necessary between machining steps. This considerably reduces time wastage between machining operations and promotes higher accuracy in machining, since the workpiece need not be transferred from one station to another between machining steps.

The main characteristic feature of the apparatus according to the invention is that it comprises in combination a vertical column mounted on a fixed base and supporting an internal machining head, a workpiece support rotatable about a vertical axis and adapted to support the hollow cylindrical workpiece so that it surrounds said column with its axis coinciding with said vertical axis of rotation, and clamping means for holding the upper end of the column rigidly during machining of the workpiece by the machining head.

Further features of the invention will be understood from the following description, given by way of example only, the reference to the accompanying drawings, wherein.

Figure 1:
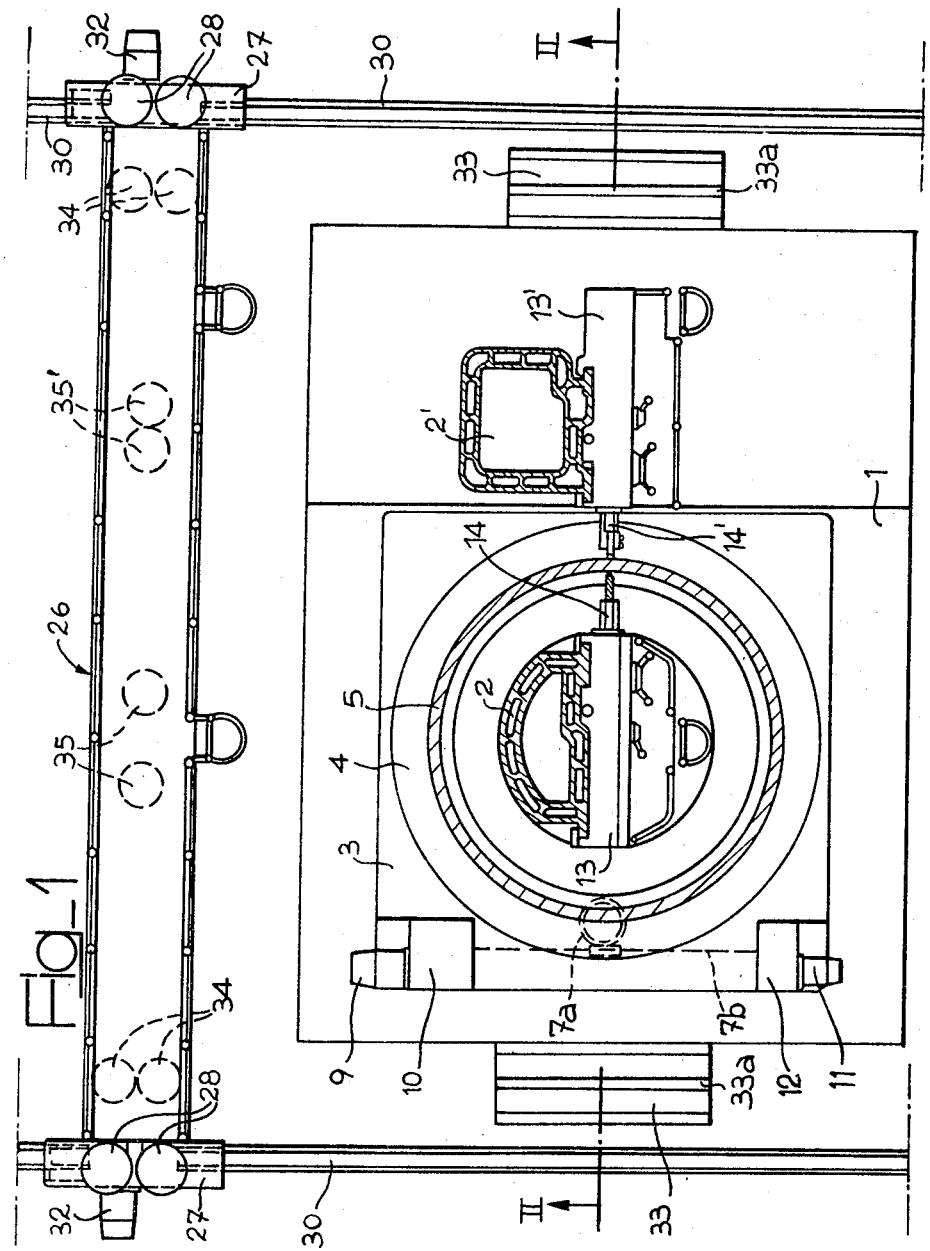
FIG. 1 is a part sectional diagrammatical plan view of apparatus for machining large diameter hollow cylindrical workpieces according to one embodiment of the invention.
Figure 2:
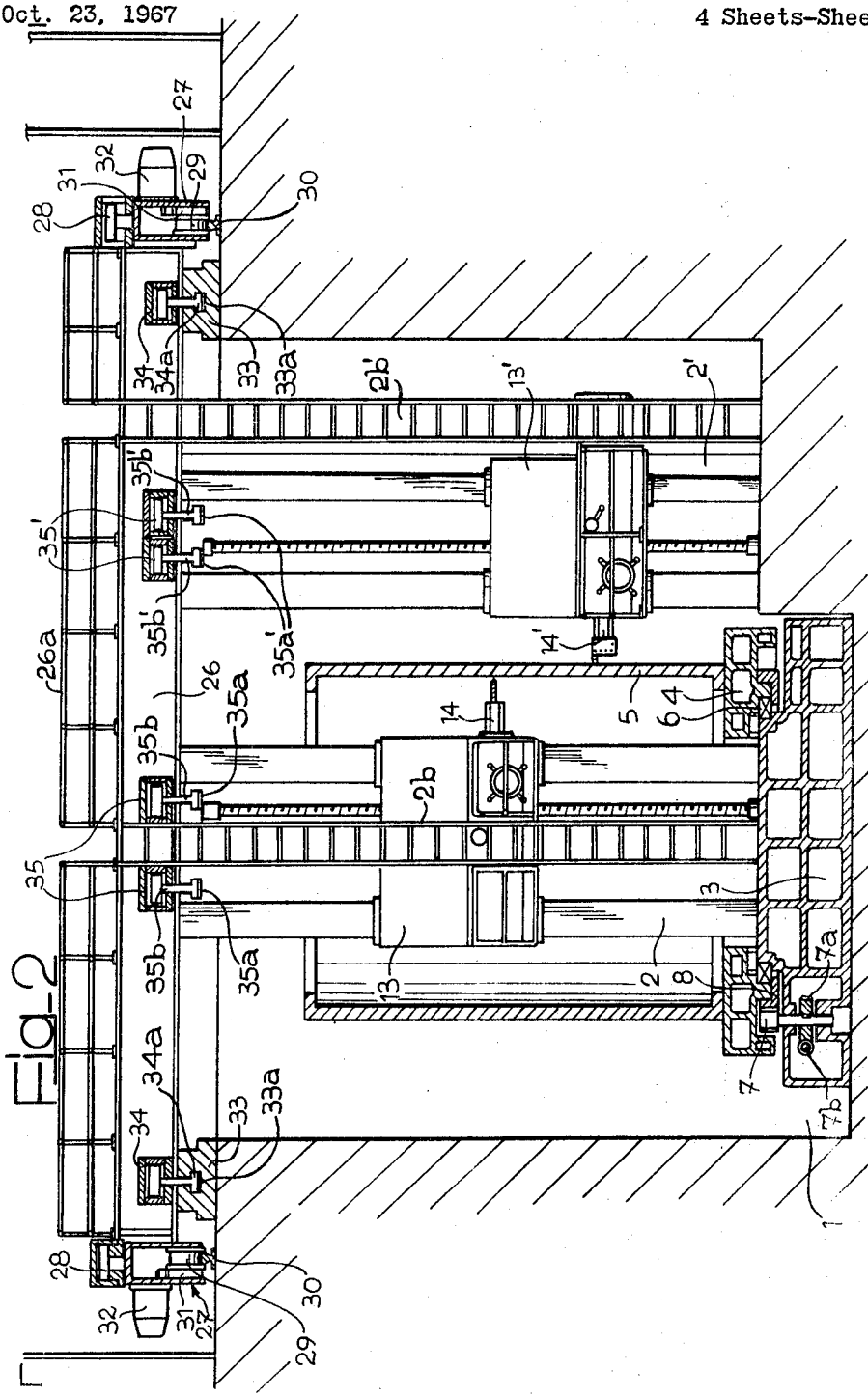
FIG. 2 is a diagrammatical sectional view on the line II—II of FIG. 1.

Referring to FIGS. 1 and 2 the machining apparatus is arranged in a pit 1 provided in the work-shop floor and includes a vertical column 2 mounted on a fixed base 3 which is located on a horizontal floor of the pit 1. An annular workpiece supporting platform 4 surrounds the column 2 at its base 3 and has a horizontal upper surface on which a hollow cylindrical workpiece 5 to be machined is supported.

The platform 4 is supported on the base 3 by roller bearings 6 for rotation about a vertical axis coinciding with the axis of the workpiece 5. Rotation of the workpiece platform 4 is effected by a pinion 7 meshing with an external ring gear member 8 secured to the platform 4. The pinion 7 is mounted on a common shaft with a worm wheel 7a which in turn meshes with a horizontal worm 7b. When carrying out turning or reaming operations the worm 7b is driven at a relatively high rotational speed by means of a direct current electric motor 9 through a gearbox 10. When rotating the platform 4 to effect accurate positioning of the workpiece 5 or to effect milling thereof, the worm 7b is driven at a lower rotational speed by a smaller D.C. motor 11 connected to the worm 7b through a gearbox 12.

The column 2 supports a vertically adjustable internal reaming/milling head 13 within the workpiece 5. The head 13 supports a horizontally adjustable radially outwardly extending headstock ram 14 of polygonal cross-section within which a rotary spindle 15 is supported. As hereinafter described in more detail the ram 14 or the spindle 15 can support different machining tools for performing different machining operations internally of the workpiece 5 as required.

An external machining arrangement similar to the internal machining arrangement described above, is also disposed in the pit 1, externally of the workpiece 5. Thus a vertical column 2' is fixed to the floor of the pit 1 externally of the platform 4. The column 2' supports a vertically adjustable external machining head 13' within which a horizontally adjustable radially inwardly extending headstock ram 14' is mounted. The ram 14' is adapted to hold different machining tools in the same way as the ram 14 for effecting external machining operations on the workpiece 5.

Figure 3:
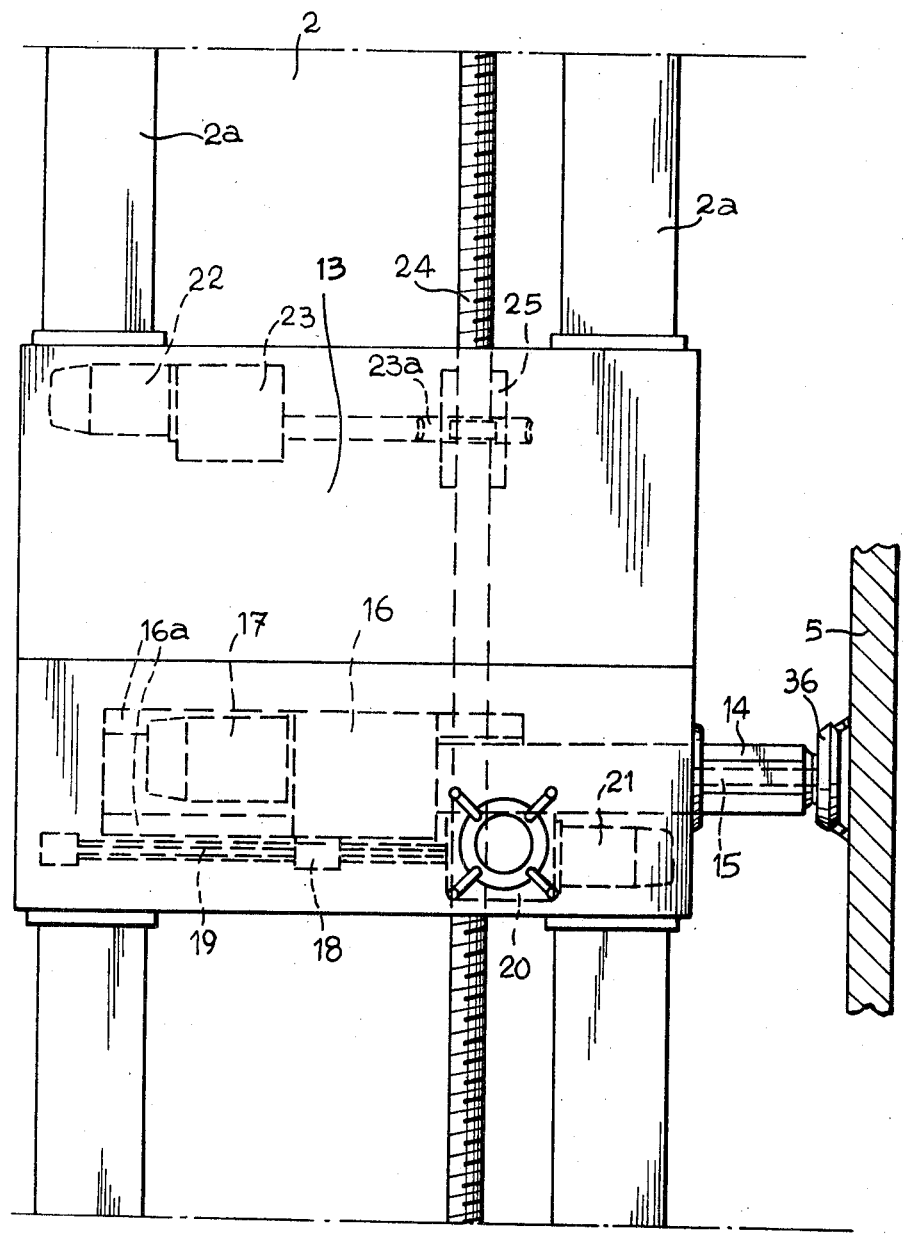
FIG. 3 is a side elevational view on an enlarged scale of part of the apparatus of FIG. 2, as applied to the performance of an internal milling operation.

FIG. 3 illustrates diagrammatically the drive mechanism incorporated in the internal machining head 13, it being understood that similar mechanisms are provided in the external maching head 13'.

The rotary spindle 15 is supported within the head 13 in suitable bearings (not shown) to enable it to withstand machining stresses. Rotary drive to the spindle 15 is provided through a reduction gearbox 16 by a D.C. motor 17 which can drive the spindle 15 at two or more selected speeds. The gearbox 16 is mounted on horizontal guideways 16a extending parallel to the direction of movement of the ram 15 in order to enhance the rigidity of the latter.

The ram 15 is attached to a nut 18 which is threaded on a leadscrew 19 extending parallel to the guideways 16a. Rotary drive is imparted to the leadscrew 19 through a reduction gearbox 20 from a D.C. motor 21, thereby effecting adjustment of the position of the ram 14 radially with respect to the axis of the workpiece 5, (part only of which is shown in FIG. 3).

The machining head 13 is movable bodily in a vertical direction along guideways 2a provided on the column 2 by means of a D.C. motor 22, also housed within the head 13, which drives a rotatable nut 25 through a reduction gearbox 23 and a worm-and-wheel drive 23a, the nut 25 being threaded on a fixed vertical leadscrew 24.

The motors 17, 21, 22 therefore impart, independently, rotary drive when required to a tool supported on the machining head 13, and also serve to position the tool both horizontally and vertically. The position of the tool, and the position of the workpiece 5, may be read out automatically by suitable position transducers (not shown) connected in a digital control system to effect machining automatically according to a predetermined program. The internal and external machining heads 13, 13' enable machining operations to be carried out both internally and externally of the workpiece 5 at the same time.

It is very important during the machining operations on the workpiece 5 to maintain the supporting column 2, 2' rigid, as any oscillations thereof will adversely affect the machining accuracy. Accordingly a beam 26 extends horizontally across the mouth of the pit 1 during machining operations, and is clamped to the upper ends of the columns 2, 2'.

The beam 26 is movable horizontally in a direction perpendicular to the length along the floor of the workshop so that is can be moved away from the mouth of the pit 1 when inserting or withdrawing a workpiece 5. For this purpose the beam 26 has feet 27 at opposite ends which may be extended vertically by means of fluid pressure operated jacks 28. Respective pairs of grooved wheels 29 are mounted on the feet 27 and engage lateral guides comprising parallel guide rails 30 extending horizontally on the workshop floor on opposite sides of the pit 1. The effect of extending the feet 27 by the jacks 28 is to raise the beam 26 a short distance so that the beam 26 is then supported entirely on the rails 30. The beam 26 can then be moved horizontally, and for this purpose each of the wheels 29 is driven through a respective reduction gearbox 31 by a pair of interconnected D.C. motors 32 mounted at opposite ends of the beam 26.

When the beam 26 is located over the centre of the pit 1 the feet 27 are retracted so that the beam 26 rests on two fixed supports 33 anchored to the workshop floor on opposite sides of the pit 1. Each support 33 has a short horizontal keyway 33a of T-section, extending parallel to the rails 30, in which is located a respective T-section clamping member 34a attached to the piston of a respective hydraulic clamp 34 secured to the beam 26.

Respective T-section keyways 35a, 35a' extending parallel to the keyways 33a are also provided in the upper ends of the columns 2, 2' respectively, two keyways being provided in this embodiment in each column 2, 2'. Respective T-section clamping members 35b, 35b', similar to the clamping members 34a, located in the respective keyways 35a, 35a' and are attached to the pistons of respective hydraulic clamps 35, 35' secured to the beam 26.

To effect clamping of the columns 2, 2' the beam 26 is first moved across the pit 1 on the rails 30 so that the clamping members 34a, 35b, 35b' are located in the respective keyways 33a, 35a, 35a'. The jacks 28 are then retracted and hydraulic pressure is supplied to the clamps 34, 35 to urge the respective clamping members 34a, 35b upwardly, thereby respectively clamping the beam 26 to the supports 33 and the columns 2, 2' to the beam 26. The upper ends of the columns 2, 2' are provided with horizontal surfaces coplanar with the horizontal supporting surfaces of the supports 33, so that, on actuating the clamps 34, 35, the beam 26 forms a stiffened structure with the two columns 2, 2'. In this way deformation and oscillation of the columns 2, 2' during heavy machining is prevented. Moreover, the beam 26 will, when clamping is effected, bend sufficiently to accommodate any unavoidable differences in the levels of the upper surfaces of the supports 33 and the column 2, 2'.

The beam 26 is provided with a walkway 26a and the columns 2, 2' have respective ladders 2b, 2b' providing access to the workpiece 5 and the machining heads 13, 13' for attendants.

Figure 4:
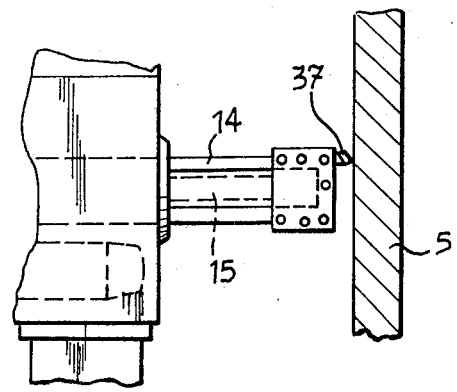
FIGS. 4, 5 and 6 are diagrammatical side views illustrating some of the various machining operations which can be carried out by the apparatus of FIGS. 1 and 2.
Figure 5:
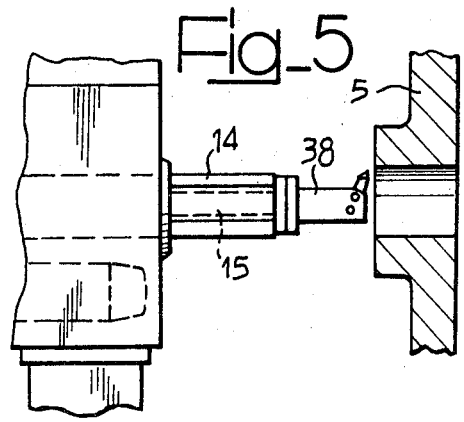
Figure 6:
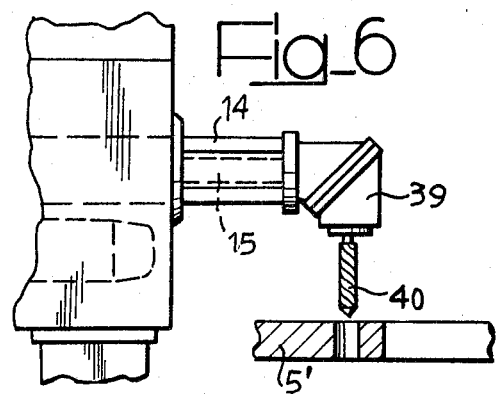

In the enlarged view of FIG. 3 the machining head 13 is shown fitted with an end milling tool 36 mounted on the end of the rotary spindle 15. FIGS. 4, 5 and 6 illustrate, by way of example, different arrangements of tools on the machining head 13.

Thus FIG. 4 shows a fixed tool 37 fitted to the ram 14 for effecting honing on the cylindrical wall of the workpiece 5. FIG. 5 shows a reamer 38 mounted on the spindle 15 for reaming holes in the cylindrical wall of the workpiece 5. FIG. 6 shows a headstock 39 fitted on the end of the ram 14 at an angle in this case 90°, the spindle 15 transmitting drive to a drill 40 for effecting drilling of axial holes in a flange 5' on the workpiece 5. Similarly, the angled headstock 39 could carry non-rotary cutting tools for effecting turning.

The tools illustrated in FIGS. 4 to 6 could be mounted equally well on the internal machining head 13 and the external machining head 13'.

By housing the workpiece 5 and the machining heads 13, 13' in a pit 1, the entire apparatus can be accommodated in a workshop of conventional height, despite the large size of the workpiece 5. An overhead crane (not shown) is used for lowering the workpiece into position and removing it when machining has been completed.

It will be appreciated that constructional details of the apparatus may be changed without departing from the scope of the invention as defined in the appended claims.

We claim:

1. Apparatus for machining a hollow cylindrical workpiece of large diameter; the apparatus comprising in combination; a fixed base; a first vertical column mounted on the base; a first machining head displaceable along the column; an annular workpiece support surrounding the first vertical column and rotatably mounted on the fixed base about a vertical axis; a second vertical column mounted next to the annular workpiece support; a second machining head displaceable along the second column; a horizontal beam above the annular workpiece support; fixed supports located at the end portions of the horizontal beam; first and second clamping means located on the horizontal beam and engageable respectively with the upper ends of the first and second columns to hold the columns rigid during machining of the workpiece; third clamping means located at the ends of the horizontal beam and engageable with the fixed supports; lateral guide means extending horizontally on opposite sides of each of the fixed supports; and feet means at each end of the horizontal beam engageable with the lateral guide means to permit movement of the horizontal beam along the lateral guide means when the clamping means are released.

2. Apparatus as claimed in claim 1, wherein the first and second clamping means are actuated by fluid pressure.

3. Apparatus as claimed in claim 1, wherein each fixed support and the upper ends of the first and second vertical columns have respective T-section keyways therein and each of the clampinng means have respective T-section clamping members which locate in the respective keyways to effect clamping.

4. Apparatus as claimed in claim 1, wherein fluid pressure jack means operatively connected to the feet means are extendable to vertically raise the horizontal beam out of engagement with the fixed supports and the first and second columns; wheels are located respectively on the feet means and engageable with the lateral guide means; and at least one motor connected to at least one of the wheels for moving the horizontal beam along the lateral guide means when each of the clamping means are in a released position.

5. Apparatus as claimed in claim 1 including at least two motors operatively connected to the rotatable workpiece support to drive the support at respectively a relatively high rotational speed for turning operations and a relatively slow rotational speed for milling operations and workpiece positioning.

6. Apparatus as claimed in claim 1, in which one of the machining heads has a headstock ram extending horizontally in a radial direction with respect to the axis of rotation of workpiece support; means for adjusting the ram horizontally in the radial direction; a rotary spindle extending within the ram in the radial direction; means for rotating the spdindle about the axis; and adaptor means on the ram and the spindle for holding turning and milling tools respectively as required.

7. Apparatus as in claim 6, wherein independent powered means are provided in the machining head for adjusting the head vertically relative to the column, adjusting the ram horizontally relative to the column, and rotating the spindle respectively.

References Cited

UNITED STATES PATENTS 3,260,140 7/1966 Burge _____ 82—2.4
3,057,234 10/1962 Heer _____ 29—26

FOREIGN PATENTS 995,555 6/1965 Great Britain.

ANDREW R. JUHASZ, Primary Examiner

Z. R. BILINSKY, Assistant Examiner

U.S. Cl. X.R.

29—38; 90—15

UNITED STATES PATENT OFFICE
CERTIFICATE OF CORRECTION

Patent No. 3,513,517                  Dated May 26, 1970

Inventor(s) Maso Galbarini et al

It is certified that error appears in the above-identified patent and that said Letters Patent are hereby corrected as shown below:

Column 1, line 5     "Societa Generale per l'Industria Metallurgica e Meccanica"
should read
"Innocenti Societa Generale per l'Industria Metallurgica e Meccanica"

SIGNED AND SEALED
FEB 1971

(SEAL)
Attest:

Edward M. Fletcher, Jr.
Attesting Officer

WILLIAM E. SCHUYLER, JR.
Commissioner of Patents

FORM PO-1050 (10-69)